(12) United States Patent
Chaet et al.

(10) Patent No.: US 6,503,031 B1
(45) Date of Patent: Jan. 7, 2003

(54) OUTER DIAMETER DEBURRING TOOL

(75) Inventors: Keith J. Chaet, Mount Laurel, NJ (US); Larry M. Cox, West Chester, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 37 days.

(21) Appl. No.: 09/840,696

(22) Filed: Apr. 24, 2001

(51) Int. Cl.⁷ .............................................. B23B 45/00
(52) U.S. Cl. ........................... 408/227; 82/113; 72/112
(58) Field of Search ................................. 408/211, 155, 408/227; 29/1.32; 82/113; 72/112

(56) References Cited

U.S. PATENT DOCUMENTS

| | | | |
|---|---|---|---|
| 3,999,452 A | * | 12/1976 | Larsen |
| 4,114,484 A | * | 9/1978 | Feamster |
| 4,819,526 A | | 4/1989 | Geise |
| 4,860,453 A | * | 8/1989 | Carroll |
| 4,958,542 A | * | 9/1990 | Skerrett |
| 5,076,122 A | | 12/1991 | Katzenburger et al. |
| 5,125,316 A | * | 6/1992 | Markle |
| 5,425,605 A | | 6/1995 | Fullbeck |
| 5,492,439 A | * | 2/1996 | Rangel |
| 5,580,008 A | | 12/1996 | Koegler et al. |
| 5,979,276 A | | 11/1999 | Blais et al. |
| 6,009,735 A | | 1/2000 | Knotek |
| 6,044,571 A | | 4/2000 | Strait |
| 6,101,696 A | * | 8/2000 | Carter |
| 6,129,488 A | | 10/2000 | Fahr |

* cited by examiner

*Primary Examiner*—William M. Pierce
(74) *Attorney, Agent, or Firm*—Mark O. Glut

(57) ABSTRACT

An outer diameter deburring tool for deburring a tubing with an outer diameter. The outer diameter deburring tool, includes: a plunger button assembly; an adapter handle, the adapter handle accepting the plunger button assembly; an outer diameter cutter for deburring the outer diameter of the tubing, the outer diameter cutter communicating with the adapter handle; and, a plunger stem assembly, the plunger button assembly communicating with the plunger stem assembly such that the plunger button assembly being able to change the position of the plunger stem assembly, the plunger stem assembly being able to prevent burrs from entering the tubing while the outer diameter cutter removes burrs from the outer diameter of the tubing.

13 Claims, 3 Drawing Sheets

OUTER DIAMETER DEBURRING TOOL

STATEMENT OF GOVERNMENT INTEREST

The invention described herein may be manufactured and used by or for the Government of the United States of America for governmental purposes without payment of any royalties thereon or therefor. The technology described herein was a subject invention under contract number N00019-93-C-0006 with the Boeing Company.

BACKGROUND

The present invention relates to an outer diameter deburring tool. More specifically, but without limitation, the present invention relates to an outer diameter deburring tool that deburrs the outer diameter of tubing and prevents burrs, shavings, thin pieces of material, chips, fragments, foreign particles, or the like from entering the tubing when the outer diameter of the tubing is being surfaced, cut, pierced, sliced, split, incised, machined, deburred, or the like.

Maintenance of machinery specifically, but without limitation, aircraft machinery involves situations in which damaged tubing needs to be removed and/or repaired. Tubing is a material in the form of a tube, a duct, a slender pipe for conveying fluids (gas or liquid), a hollow elongated cylindrical body, or any similar type of means, system or mechanism. In aircraft, tubing is typically manufactured from rubber, plastic, metal, metal alloys, or any class of chemical elements that can conduct heat and/or electricity. Removal and/or repair of the tubing sometimes requires cutting out the damaged section using a tube cutter kitset. The cutting process, especially in metal and metal alloy tubing such as titanium tubing, severs the tubing by penetrating and displacing the tubing material. The cutting process typically creates a protruding ragged edge, a thin ridge, a raised narrow strip or an area of roughness near the area of the cut. After the cutting, the tubing is reconnected using a union fitting. The displaced material and/or area created by the cutting process, commonly referred to as "roll-over" or "burrs", increases the tubing outer diameter at the cut end. For thick walled tubing, this roll-over effect inhibits the tubing from fitting into the union fitting or any other type of fitting. This occurrence is particularly evident with titanium tubing, which is used on hydraulic tubing of aircraft. Surfacing tools can remove the burrs or rolled-over material. This removal process of burrs, rolled-over material, attached chips or slivers or strips, ridges, jagged edges or the like, is commonly referred to as deburring.

Deburring may be performed at a grinding station or at a lathe. This method requires the removal of the entire tubing from the machinery. However, this method cannot be used when there is no easy access to the burr(s) or the tubing cannot be removed from the machinery. Also, removal and replacement of the tubing may be a long and complex process, especially in aircraft. Therefore, removal of the entire tubing from the aircraft or machine may not be time or cost efficient, especially when dealing with military aircraft where time is valuable commodity.

A hand held surfacing tool may be used to deburr tubing. During the surfacing or deburring process burrs, rolled-over material, chips, slivers or the like can fall into the tubing. If foreign particles are present within any tubing of aircraft or any other type of machinery, this could cause operational as well as safety problems. In addition, cleaning the inside of tubing can be very difficult and time consuming, if at all possible. Therefore, it is imperative that none of the chips, shavings, slivers, burrs, rolled-over material, foreign particles, or the like enter the tubing when the outer diameter is being surfaced or deburred.

Information relevant to these attempts to address these problems can be found in U.S. Pat. Nos. 4,819,526, 5,076,122, 5,425,605, 5,580,008, 5,979,276, 6,009,735, 6,044,571, and 6,129,488. (None of these references are admitted to be prior art with respect to the present invention.) However, each of these references does not address the problem when the outer diameter is being surfaced or preventing burrs from entering inside the tubing.

For the foregoing reasons there is a need for an outer diameter deburring tool that effectively deburrs the outer diameter of tubing and prevents foreign particles from entering the inside of tubing.

SUMMARY

The instant invention is directed to an outer diameter deburring tool that satisfies the needs enumerated above and below.

The present invention is directed to an outer diameter deburring tool that includes a plunger button assembly, an adapter handle, an outer diameter cutter, and a plunger stem assembly. The adapter handle accepts the plunger stem assembly, and the outer diameter cutter communicates with the adapter handle. The plunger button assembly communicates with the plunger stem assembly such that the plunger button assembly is able to change the position of the plunger stem assembly. The plunger stem assembly is able to prevent burrs or foreign particles from entering the tubing while the outer diameter cutter deburrs the tubing.

It is an object of the present invention to provide an outer diameter deburring tool that prevents foreign particles from entering the inside of tubing when the outer diameter of the tubing is being deburred or surfaced. Furthermore, it is another object of the invention to provide an outer diameter deburring tool that provides a tubing system that is free of shavings and burrs as well as a tighter tolerance fit when tubing is reworked and refit.

It is an object of the present invention to provide an outer diameter deburring tool that is hand held and portable. It is also an object of the invention to provide an outer diameter deburring tool that is easy and inexpensive to manufacture.

It is an object of the present invention to provide an outer diameter deburring tool that does not require the tubing that will be deburred to be removed from the machinery.

It is an object of the present invention to provide an outer diameter deburring tool that enhances uniformity in burr removal from the outer diameter of tubing.

It is an object of the invention to provide an outer diameter deburring tool that will effectively remove roll-over material from thick walled titanium hydraulic tubing and prevent any foreign matter from entering the tubing during this process.

DRAWINGS

These and other features, aspects and advantages of the present invention will become better understood with reference to the following description and appended claims, and accompanying drawing wherein:

DESCRIPTION

Figure 1:
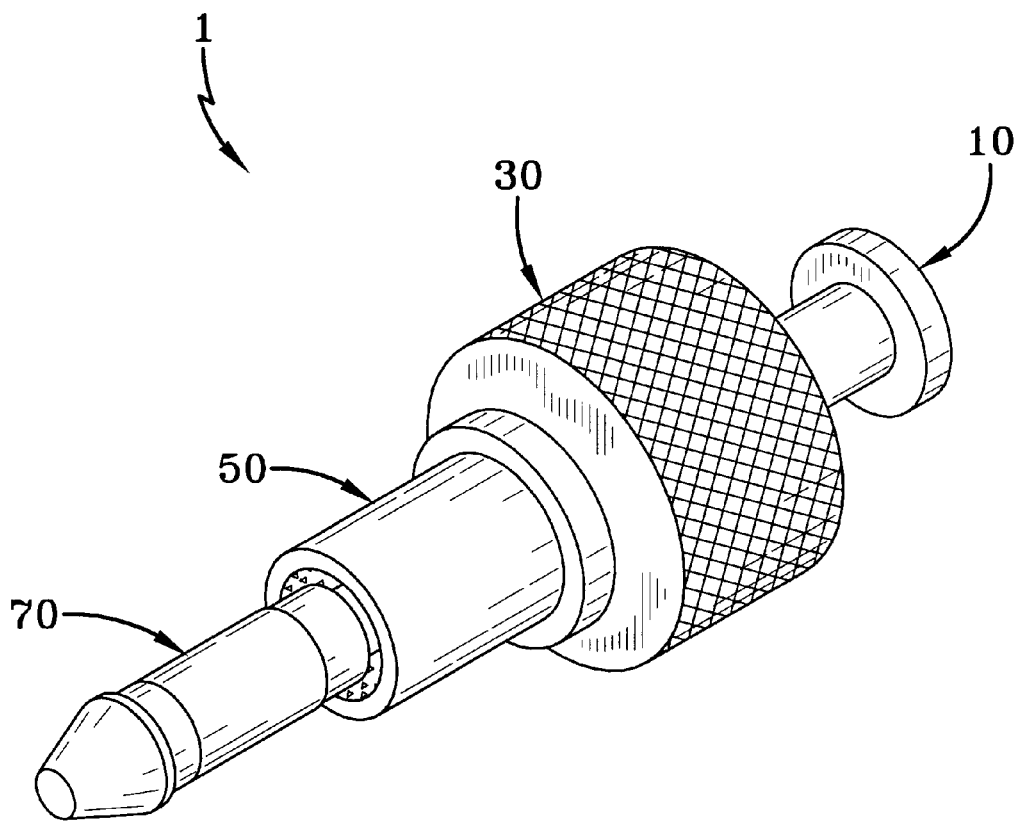
FIG. 1 shows a perspective view of the outer diameter deburring tool.
Figure 2:
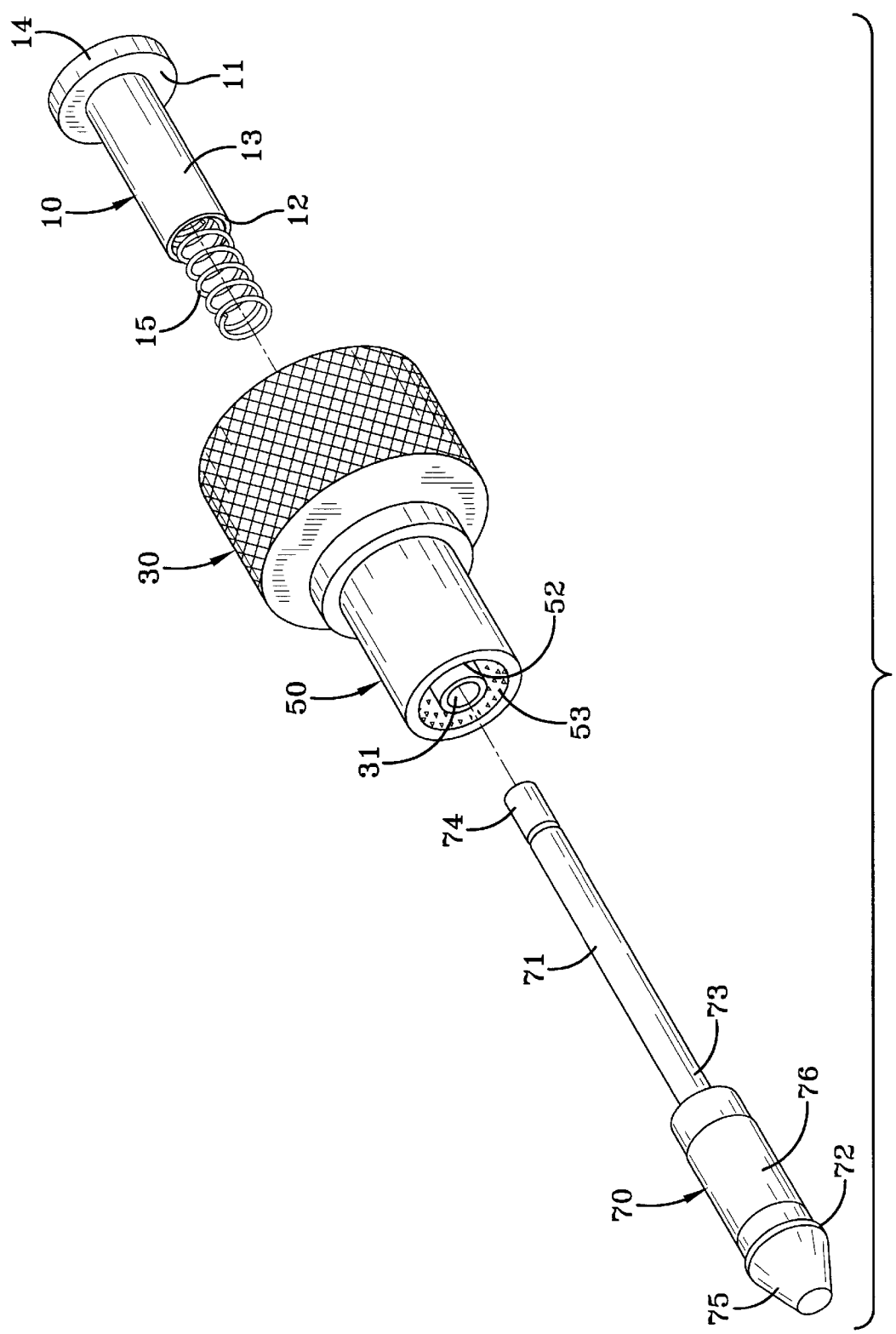
FIG. 2 shows an exploded perspective view of the outer diameter deburring tool.

The preferred embodiment of the present invention is illustrated by way of example in FIGS. 1, 2, 3 and 4. As shown in FIGS. 1 and 2 an outer diameter deburring tool 1 includes a plunger button assembly 10, an adapter handle 30, an outer diameter cutter 50 and a plunger stem assembly 70.

The plunger button assembly 10 can have a plunger button first end 11 and a plunger button second end 12. As shown in FIGS. 1 and 2, the plunger button assembly 10 can be a cylindrical shaft 13 with a plunger button disk 14 disposed on the plunger button first end 11. The plunger button disk 14 allows the user to depress and apply pressure on the plunger button assembly 10 with ease and without injury or discomfort. A plunger button spring 15 can be disposed on the plunger button second end 12. The cylindrical shaft 13 may be hollowed out at the plunger button second end 12, and a portion of the plunger button spring 15 may be inserted into the hollowed out portion of the plunger button assembly 10. The plunger button spring 15 can be axially aligned with the cylindrical shaft 13. The axis of a cylinder is typically the center of the cross sectional area (typically a circle in the case of a cylinder). Similarly, the axis of a spring is typically the center point of a cross sectional area of the spring. To be axially aligned the axes of the objects are aligned such that it appears that all the axes continue as one straight axis.

Figure 3:
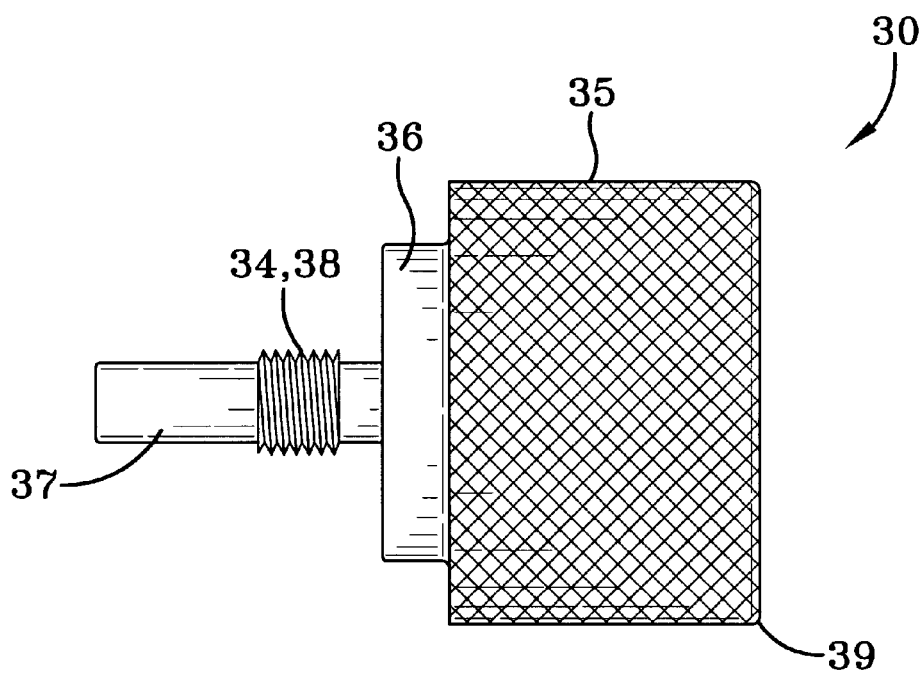
FIG. 3 shows a side view of the adapter handle.
Figure 4:
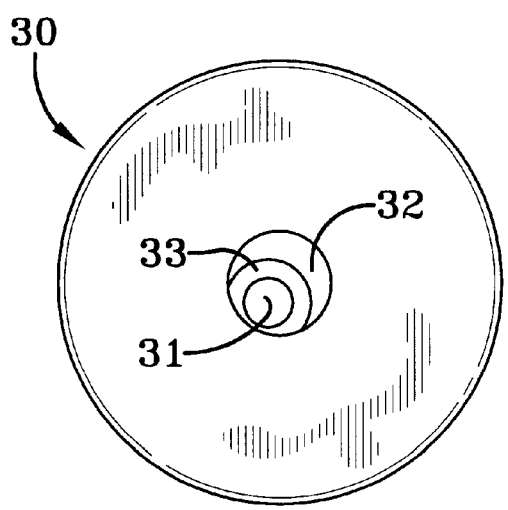
FIG. 4 shows a top view of the adapter handle.

The adapter handle 30 accepts the plunger button assembly 10. As shown in FIGS. 3 and 4 the adapter handle 30 of the outer diameter deburring tool 1 of FIG. 1 and 2 can be cylindrical in shape. As shown in FIG. 4, at a circular cross section the adapter handle 30 can have an opening, bore, hole or passage that is cylindrical in shape and is disposed in the middle of the cross sectional area. This opening can be referred to as the adapter handle opening 31. At the end of the opening there may be a counterbore. A counterbore is a flat-bottomed enlargement of the mouth of a cylindrical bore. The counterbore may be referred to as adapter handle counterbore 32. The counterbore 32 may be disposed in the middle of the cross sectional area. The adapter handle opening 31 and adapter handle counterbore 32 may be axially aligned. The plunger button second end 12 and plunger button spring 15 slip into the adapter handle counterbore 32 and then come to rest on a counterbore lip 33 on the inside of the adapter handle 30. The counterbore lip 33 closes around the adapter handle opening 31. The adapter handle opening 31 is a smaller hole than the adapter handle counterbore 32, and also continues through the adapter handle 30.

The adapter handle 30 can be a solid piece of material with a counterbore (adapter handle counterbore 32) and a smaller through hole (adapter handle opening 31). Both the adapter handle counterbore 32 and adapter handle opening 31 may accept the plunger stem assembly 70 and plunger button assembly 10 such that the plunger stem assembly 70 may communicate with the plunger button assembly 10. The adapter handle 30 may also contain an adapter handle threaded portion 34, which accepts the outer diameter cutter 50. The adapter handle 30 provides a stable platform on which the plunger button assembly 10, plunger stem assembly 70 and outer diameter cutter 50 can be attached.

As shown in FIG. 3 the adapter handle 30 may have an adapter handle main portion 39 and an adapter handle neck 37. The adapter handle main portion 39 can be cylindrically shaped. The adapter handle neck 37 is an outwardly extending rod, cylinder, tube, arbor, shaft, bar, axis, axle or attachment emanating or protruding from the adapter handle main portion 39. The adapter handle main portion 39 and adapter handle neck 37 may be. axially aligned or have parallel radii.

The adapter handle main portion 39 may have a larger cross sectional area or diameter than the adapter handle neck 37. Both the adapter handle main portion 39 and the adapter handle neck 37 can be hollowed out and can create a pathway to and from the adapter handle opening 31 or just be a continuation of the adapter handle opening 31 or the adapter handle counterbore 32. The adapter handle neck 37 can extend from the adapter handle opening 31. In the preferred embodiment, the adapter handle main portion 39 has the adapter handle counterbore 32 disposed at its center or axis, while the adapter handle neck 37 has the adapter handle opening 31 disposed at its center or axis.

The outer diameter cutter 50 and adapter handle neck 37 may have corresponding threads such that the outer diameter cutter 50 may be screwed into and onto the adapter handle neck 37. The adapter handle neck 37 may have adapter handle neck threads 38 located on the outer diameter of the adapter handle neck 37. The outer diameter cutter 50 may have inner diameter threads that allow communication with the adapter handle neck threads 38. The adapter handle neck threads 38 may be located on the end of the adapter handle neck 37 attached or closer to the adapter handle main portion 39.

In the preferred embodiment, the plunger stem assembly 70 is inserted through the adapter handle neck 37 via the adapter handle opening 31 and then through the adapter handle main portion 39, while the plunger button assembly 10 is inserted through the adapter handle main portion 39 via the adapter handle counterbore 32. Both the plunger stem assembly 70 and the plunger button second end 12 may have corresponding threads. In the preferred embodiment, the plunger stem assembly 70 screws into the plunger button assembly 10, which enters on the opposite side of the adapter handle 30 via the adapter handle counterbore 32.

The adapter handle 30 may have an external crosshatched area 35. The external crosshatched area 35 can be located on the outer diameter of the adapter handle main portion 39. This external crosshatched area 35 can be used to hold the outer diameter deburring tool 1 when it is in operation or being moved or transported. The adapter handle outer surface or external crosshatched area 35 may be knurled. Knurling produces a regularly shaped roughened surface on a workpiece. The knurling may be done using a knurling tool with forming rolls or by cutting chips, or any other method that creates a knurled surface. The adapter handle 30 may also have a beveled area 36 that creates a smaller outer diameter. This smaller outer diameter may be of similar size as the outer diameter cutter 50. The outer diameter of the beveled area 36 may be a size in between the outer diameter of the adapter handle main portion 39 and the adapter handle neck 37. The beveled area 36 may be axially aligned with the adapter handle main portion 39 and the adapter handle neck 37. As shown in FIG. 2, the outer diameter cutter 50 and the adapter handle neck 37 are axially aligned and may have corresponding lengths.

The outer diameter cutter 50 is typically a rounded cutting or surfacing tool whereby the cutting or surfacing element 53 of the outer diameter cutter 50 is on the inside diameter 52 of the outer diameter cutter 50. The outer diameter cutter 50 may be a rotary cutting element. In operation, the outer diameter cutter 50 can be placed over the outer diameter of the tubing that is being machined such that the inside diameter 52 (i.e. the cutting element 53) of the outer diameter cutter 50 is able to deburr, cut or machine the outer diameter of the tubing. The outer diameter cutter 50, specifically the cutting element 53, may be manufactured from any type of metal, carbon based product, plastic, ceramic or any type of material used to manufacture a rounded cutting tool. The preferred material is carbide (a compound of metal with carbon). Carbide has proved to be more effective on titanium tubing as well as other types of tubing. The outer diameter deburring tool 1 may have an interchangeable outer diameter cutter 50 with different size cutting elements. This would allow the tool to deburr different size tubing. The outer diameter cutter 50 may further be mounted on a rotary driver to drive the outer diameter cutter 50 and to allow quicker deburring. The cutting element 53 may be a series of cutter teeth at various angles at the front end of the outer diameter cutter 50. A cutter tooth may be defined, but without limitation, as a projection resembling or suggesting a tooth as on a comb, saw, gear, rack, sprocket, rake, or the like that has the ability to cut or shear. A series of cutter teeth at various angles is at least two, preferably more, cutter teeth arranged in a row or coming one after another. The preferred embodiment contains cutter teeth throughout the inside diameter 52 of the outer diameter cutter 50. When the cutter teeth interface with the outer diameter of the tubing, the series of cutter teeth shear off any burrs or roll-over material. The shearing action of the cutter teeth as a force is applied when turning the cutter. On the back end of the outer diameter cutter 50, there are threads located on the inner diameter such that they can interface and connect with the adapter handle neck threads 38. The outer diameter cutter 50 may also contain a cutter hole, which allows insertion of a spanner wrench. The cutter hole can be utilized when frictional forces prevent hand/manual removal of the outer diameter cutter 50 from the adapter handle 30.

The plunger stem assembly 70 can include a plunger stem assembly shaft 71 and a plunger stem stopper 72. A stopper is typically something inserted to close an opening. The plunger stem stopper 72 can in the shape of a conic section, and typically the larger end of the conic section is larger than the inner diameter of the tubing being deburred. The plunger stem stopper 72 may have a plunger stem stopper first end 75 and a plunger stem stopper second end 76. The plunger stem stopper first end 75 can be a truncated conic section. The plunger stem stopper second end 76 may be plunger stem stopper cylinder. The largest diameter of the truncated conic section may taper down to the plunger stem stopper cylinder, which is a smaller diameter than the largest diameter of the truncated conic section. The plunger stem stopper cylinder may in turn taper down to the plunger stem assembly shaft 71. The plunger stem stopper first end 75, the plunger stem stopper second end 76 and plunger stem assembly shaft 71 may all be axially aligned.

In operation, the plunger stem stopper 72, specifically the plunger stem stopper first end 75, is inserted into the inner diameter of the tubing being deburred. This prevents any burrs or foreign particulate from entering the tubing. The outer diameter deburring tool 1 may have interchangeable plunger stem stoppers 72. This would allow different size stoppers to be attached to the outer diameter deburring tool 1 so that a wider range of different size tubing can be deburred.

The plunger stem assembly shaft 71 may be cylindrical in shape, an elongated body, a rod, an arbor or the like. The plunger stem assembly shaft 71 has a first plunger stem assembly shaft end 73 and a second plunger stem assembly shaft end 74. The plunger stem stopper 72 may be disposed at the first plunger stem assembly shaft end 73. Specifically, the first plunger stem assembly shaft end 73 is communicating with the plunger stem stopper second end 76. The second plunger stem assembly shaft end 74 can enter the adapter handle opening 31, while the plunger button second end 12 and plunger button spring 15 can enter the adapter handle counterbore 32 such that the second plunger stem assembly shaft end 74 and plunger button second end 12 are communicating. The second plunger stem assembly shaft end 74 and the plunger button second end 12 may contain corresponding threads so they may be screwed to each other.

To assemble the preferred embodiment of the outer diameter deburring tool 1, the outer diameter cutter 50 is screwed into/onto the adapter handle neck 37 via the adapter handle threaded portion 34. Next the second plunger stem assembly shaft end 74 is inserted into and through the adapter handle neck 37 via the adapter handle opening 31, and the plunger button second end 12 is inserted into and through the adapter handle 30 via the adapter handle counterbore 32. The plunger stem assembly 70 screws into the plunger button assembly 10. Prior to inserting the plunger button second end 12 into the adapter handle counterbore 32, a plunger button spring 15 can be attached to the plunger button assembly 10 on the plunger button second end 12. In operation, the plunger button spring 15 rests on a lip (counterbore lip 33) inside the adapter handle 30. The plunger button spring 15 fits around the plunger stem assembly 70, specifically the plunger stem assembly shaft 71.

In operation of the preferred embodiment, the plunger stem stopper 72, specifically the plunger stem stopper first end 75, may enter the tubing such that the plunger stem stopper 72 prevents any burrs or foreign particles from entering the inside of the tubing. To operate the outer diameter deburring tool 1, one may depress the plunger button assembly 10 (specifically the plunger button disk 14) into the adapter handle 30 until the plunger stem stopper 72 of the plunger stem assembly 70 is no longer touching the adapter handle 30. This will cause the plunger stem stopper 72 (or part of it) to be inserted in to the tubing. Once the plunger stem stopper 72 is inserted into the tubing, release the plunger button assembly 10, specifically the plunger button disk 14. Press the outer diameter cutter 50 toward the tubing while turning in a clockwise or counter clockwise motion. After a few complete turns retract the outer diameter deburring tool 1 and check to see if the outer diameter of tubing is resurfaced to the necessary requirements.

Although the present invention has been described in considerable detail with reference to certain preferred versions thereof, other versions are possible. Therefore, the spirit and scope of the appended claims should not be limited to the description of the preferred versions contained herein.

What is claimed is:

1. A manual outer diameter deburring tool for deburring a tubing, said tubing having an outer diameter, the outer diameter deburring tool comprising:

(a) a plunger button assembly, the plunger button assembly comprises of a plunger button disk, a plunger button spring and a cylindrical shaft, the cylindrical shaft comprising of a cylindrical shaft first end and a cylindrical shaft second end, the plunger button disk disposed at the cylindrical shaft first end and the plunger button spring disposed at the cylindrical shaft second end;

(b) an adapter handle, the adapter handle coaxially accepting the plunger button spring and the cylindrical shaft second end;

(c) an outer diameter cutter for deburring said outer diameter of said tubing, the outer diameter cutter rotatably and coaxially attached to the adapter handle, the outer diameter cutter being a rounded cutting tool; and, (d) a plunger stem assembly, the plunger stem assembly comprises of a plunger stem stopper and a plunger stem assembly shaft, the plunger stem stopper attached to an end of the plunger stem assembly shaft, the adapter handle coaxially accepting the plunger stem assembly shaft, the plunger button spring and the cylindrical shaft coaxially associated with the plunger stem assembly shaft such that when applying pressure on the plunger button disk the plunger button disk can change the position of the plunger stem stopper via the cylindrical shaft and plunger button spring, the plunger stem stopper being able to prevent burrs from entering said tubing while the outer diameter cutter removes burrs from said outer diameter of said tubing.

2. The outer diameter deburring tool of claim 1, wherein the adapter handle is cylindrical.

3. The outer diameter deburring tool of claim 2, wherein the adapter handle having an adapter handle opening and counterbore, the plunger stem assembly entering the adapter handle opening and counterbore such that the plunger button assembly communicates with the plunger stem assembly.

4. The outer diameter deburring tool of claim 3, wherein the plunger stem assembly screws into the plunger stem assembly.

5. The outer diameter deburring tool of claim 4, wherein the adapter handle further comprising of an adapter handle main portion and an adapter handle neck, the adapter handle main portion containing the counterbore and the adapter handle neck containing the adapter handle opening, the adapter handle main portion and the adapter handle neck being cylindrically shaped, the adapter handle main portion having a larger diameter than the adapter handle neck, the plunger stem assembly entering the adapter handle opening, the plunger button assembly entering the counterbore.

6. The outer diameter deburring tool of claim 5, wherein the adapter handle main portion comprises of a adapter handle main portion outer surface, the adapter handle main portion outer surface being knurled.

7. The outer diameter deburring tool of claim 6, wherein the outer diameter cutter is manufactured from carbide.

8. The outer diameter deburring tool of claim 7, wherein the adapter handle main portion, the adapter handle neck, the plunger button assembly and plunger stem assembly being axially aligned.

9. The outer diameter deburring tool of claim 8, wherein the outer diameter cutter includes an inner diameter, the outer diameter cutter having a series of cutter tools at various angles, the series of cutter tools of various angles being located at the inner diameter of the outer diameter cutter such that the series of cutter tools can deburr the outer diameter of said tubing.

10. The outer diameter deburring tool of claim 9, wherein the outer diameter cutter has a cutter hole.

11. The outer diameter deburring tool of claim 10, wherein the plunger stem stopper and outer diameter cutter are interchangeable to allow different size tubing to be deburred.

12. The outer diameter deburring tool of claim 11, wherein the adapter handle main portion includes a counterbore lip, the counter bore lip closes around the adapter handle opening, the plunger button spring resting on the counterbore lip.

13. The outer diameter deburring tool of claim 12, wherein the cutter tools are a series of cutter teeth.

* * * * *